May 18, 1937. G. H. NORRIS 2,080,500
HYDRAULIC NOZZLE
Filed Aug. 26, 1935
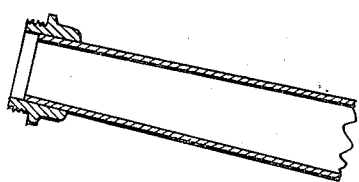
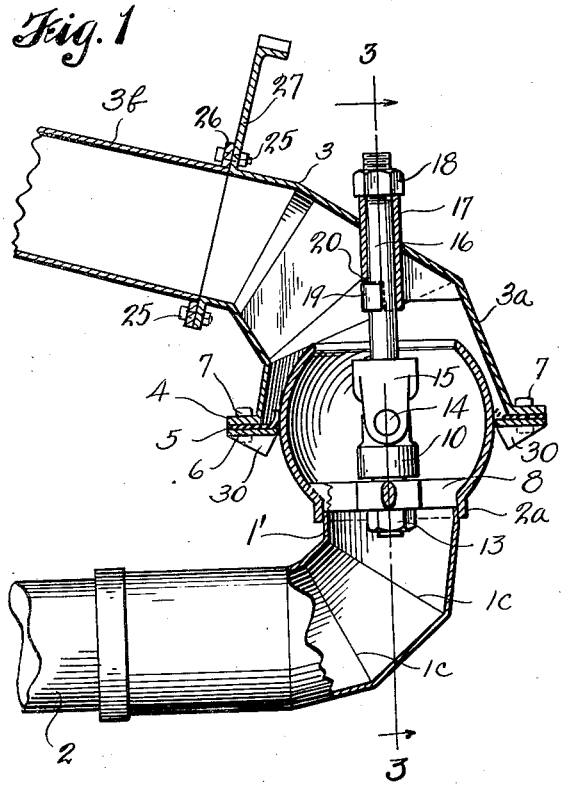
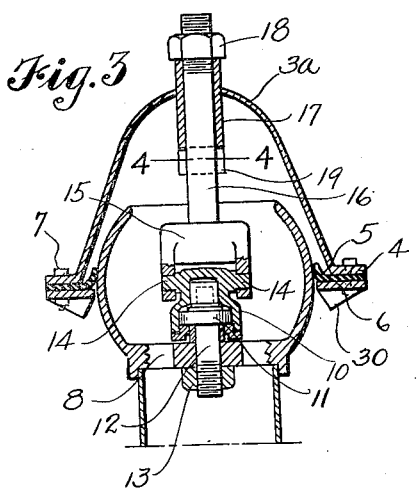
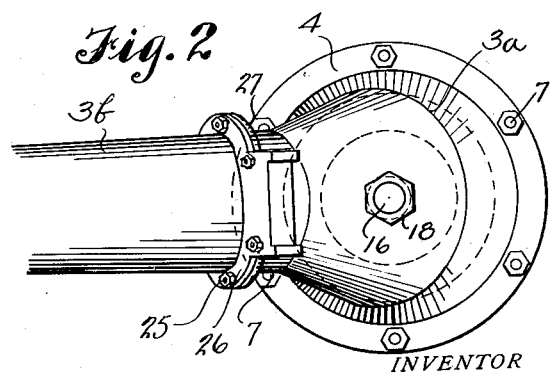
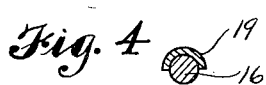
INVENTOR
GEORGE H. NORRIS
BY Cook & Robinson
ATTORNEY Patented May 18, 1937

2,080,500

UNITED STATES PATENT OFFICE 2,080,500

HYDRAULIC NOZZLE

George H. Norris, Seattle, Wash., assignor to Hydraulic Supply Manufacturing Company, Seattle, Wash.

Application August 26, 1935, Serial No. 37,885

4 Claims. (Cl. 285—93)

This invention relates to improvements in nozzles, and has reference more particularly to an improved construction as applied to nozzles of that type especially designed for placer mining operations.

Explanatory to the present invention, it will here be stated that the universally adopted nozzle which has been in use, generally, for the past 30 or 40 years in placer mining, comprises a cast iron elbow adapted for connection at one end with the water supply and equipped at its other end with a flange on which a nozzle base is fitted for rotation in a horizontal plane, and which nozzle base is formed with a ball joint which mounts the nozzle proper in a manner permitting it to swing at its outer end on a vertical plane. This particular construction, as heretofore used, is an assemblage of parts that is exceedingly heavy and is difficult to handle and transport, which requires a plurality of sealed joints to prevent leakage, and is a construction that is relatively expensive to manufacture.

In view of the above objectionable features, it has been the principal object of the present invention to provide an elbow member of fabricated construction and embodying at its upwardly directed end a single ball joint member which mounts the nozzle base directly thereon and permits of a universal action of the nozzle, thereby eliminating the horizontally revoluble base as previously employed, with a resultant material decrease in weight, cost of construction and upkeep requirements.

Another object of this invention is to provide a nozzle design that lends itself readily to fabrication, thereby materially lessening the cost of manufacture over that of the cast metal constructions, and with a substantial lessening of weight.

Other objects of this invention reside in the details of construction and combination of parts whereby the nozzle is held against lateral tipping in its adjustment about the ball joint and whereon there is means whereby the vertical swinging of the end of the nozzle may be limited to a definite angle.

In accomplishing the above, and other objects of this invention, I have provided the improved details of construction, the preferred forms of which are illustrated in the accompanying drawing, wherein—

Fig. 1 illustrates the present nozzle in elevation with parts thereof broken away and also with parts shown in vertical cross section for purpose of better illustration of the ball joint.

Fig. 2 is a plan view of the nozzle base.

Fig. 3 is a cross section taken on the line 3—3 in Fig. 1.

Fig. 4 is a cross sectional detail on line 4—4 in Fig. 3.

Referring more in detail to the drawing—

1 designates an elbow member, comprising a horizontal portion for connection with the water supply main, designated at W, and the upwardly directed end portion 1' to which a cast steel ball joint member 2 is welded. The elbow 1 preferably would be a fabricated construction, comprising a plurality of parts that are welded together as indicated by the lines 1c.

The ball joint member 2 is hollow for the flow of water and has a lower end neck portion 2a within which the upper end of the elbow member 1' is fitted and welded. The upper side of the ball is open thereby providing for free flow of water from the elbow upwardly through the ball.

The nozzle in its entirety is designated by reference numeral 3. It comprises a fabricated base or mounting end portion 3a and the nozzle tube 3b. The base portion 3a is of a size adapted to receive the ball 2 and it is provided with an encircling, annular flange 4 which encircles the ball in its plane of greatest diameter, and there is a sealing gasket 5 clamped to the under side of the flange 4 by an underlying annular plate 6 that is bolted to flange 4 by means of the bolts 7. The gasket has a flexible inner peripheral portion fitted diametrically about the ball and lying thereagainst in a manner whereby the water pressure against the gasket more tightly forms the sealed joint.

Cast within the base portion of the ball 2 is a horizontal spider 8 which mounts a knuckle having a lower end portion 10 revolubly supported by an anti-friction bearing 11 on a supporting shank 12 that is fixed vertically and centrally in the spider by a nut 13 threaded on to its lower end.

The part 10 is formed at diametrically opposite sides with horizontally extended trunnions 14—14 which pivotally mount an upper member 15 of the knuckle. This upper member 15 has a shaft 16 mounted thereby and extended upwardly and through a sleeve 17 that is fixed within and extends upwardly through the top of the nozzle base 3a. A nut 18 threaded onto the upper end of the shaft 16 and against the upper end of the sleeve 17 holds the nozzle against upward displacement, while a lug 19, welded on the shaft 16 and seated within a notch or recess 20 in the lower end of the sleeve supports the nozzle against downward movement about the ball and maintains the sealing gasket in a plane diametrical of the ball.

In the mounting of the nozzle on the shaft there is a definite relationship to the direction of the hinge axis of the upper and lower parts of the knuckle, whereby the direction of the nozzle and its plane of vertical adjustment is perpendicular to the axial line of the trunnions 14—14. Thus, while there may be a free rotation of the nozzle about the ball 2 and a free vertical swing of the nozzle end, there can be no lateral tipping of the nozzle base on the ball, and this is due to the rigidity of the knuckle part 15 and the shaft 16, and the fact that the lug 19 is interlocked with the sleeve 17 to maintain the nozzle against rotation relative to the knuckle.

For convenience in assembly, the nozzle 3b is bolted to the nozzle base 3a by bolts 25 extended through a base flange 26 on the nozzle and a plate 27 fixed to the nozzle base.

With the nozzle so constructed, there is provided a light, substantial and very efficient unit, which may be made in various sizes and at comparatively low cost.

In the use of this device, the water is supplied through the pipe W and is directed by adjustment of the nozzle about the ball 2. The nozzle may be rotated about the ball in a horizontal plane and, at the same time it is tipped, may be raised and lowered within definite limits to meet the requirements of the device. In order to meet the vertical angular adjustment of the nozzle, I have provided stops 30 that are welded to the ring at diametrically opposite points and which are adapted to engage with the collar 2a of the ball to limit the upward and downward swing of the nozzle.

While the action of the nozzle is perfectly free in rotation and vertical adjustment, the toggle arrangement supports the nozzle functionally in position at all times.

For disassembly, it is only necessary to remove the nut 18 from the shaft 16 and lift the nozzle upwardly from the shaft. The gasket 5 provides an automatic seal for the joint and is maintained tight at all times due to the internal water pressure.

Devices of this character may be made in various sizes and dimensions and it is apparent that minor details of construction can be altered without departing from the spirit of the invention. Therefore, it is not desired that all claims should be restricted to the details herein illustrated, but that they should be given an interpretation that is commensurate with the scope of the invention disclosed.

Having thus described my invention, what I claim as new therein and desire to secure by Letters Patent is—

1. In combination, two members associated for ball joint articulation, and a knuckle operatively connecting the articulated members; said knuckle comprising a first part, fixed rotatably in one of the articulated members for rotation about an axial line through the center of articulation of the members, and a second part having a fixed connection with the other of the articulated members and connected with the said first part of the knuckle to swing hingedly thereon about an axis through the center of articulation and perpendicular to the axis of rotation of the first part.

2. In combination, a hollow ball joint member, a fitting articulated therewith, a knuckle operatively connecting the said ball joint member and fitting, a support for the knuckle fixed in said ball joint member; one part of the knuckle being mounted by said support for rotation coaxial of a line through the center of articulation, the other part of the knuckle having a hinged connection with the first part for swinging action about an axial line through the center of articulation and perpendicular to the axis of rotation of the first part and means on the second mentioned part of the knuckle for mounting the fitting and for maintaining it in a definite relationship to the hinge axis.

3. The combination with a ball joint member and a nozzle articulated therewith, of a knuckle operatively connecting said ball joint member and nozzle comprising a first part that is fixed in the ball joint member for rotation coaxial of a line through the center of articulation, and a second part pivotally attached to the first part for hinging action about an axis through the center of articulation and perpendicular to the axis of rotation of the first part, a shaft fixed on the second part of the knuckle a sleeve fixed in the said nozzle to receive the shaft, interfitting parts on said shaft and sleeve to prevent relative rotation, and a nut applied to the shaft and against the sleeve whereby the relationship of the nozzle to the hinge axis is maintained.

4. In combination, a hollow ball joint member having an opening at its upper side and a nozzle fitted for articulation about said ball joint member and maintaining communication with said opening, a knuckle operatively supporting the nozzle from the ball joint member comprising a first part rotatably fixed in the ball joint for rotation about a vertical axis through the center of articulation, and a second part hinged to the first part for swinging in a vertical plane about a horizontal axis through the center of articulation and having a shaft thereon extended through the opening of the ball joint member; said shaft having its outer end threaded and having a lug fixed thereon spaced from the threaded end, a sleeve fixed in the nozzle to receive the shaft therethrough and extending to the outside of the nozzle and having a notch at its inner end to receive the shaft lug, and a nut applied to the threaded end of the shaft and against the sleeve to hold the parts in assembled relation.

GEORGE H. NORRIS.